US012610247B2

(12) United States Patent
Chenumolu

(10) Patent No.: US 12,610,247 B2
(45) Date of Patent: Apr. 21, 2026

(54) SYSTEMS AND METHODS FOR GENERATING A SNAPSHOT OF CURRENT NETWORK TOPOLOGY

(71) Applicant: Boost SubscriberCo L.L.C., Englewood, CO (US)

(72) Inventor: Siddhartha Chenumolu, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 299 days.

(21) Appl. No.: 18/243,413

(22) Filed: Sep. 7, 2023

(65) Prior Publication Data

US 2025/0080994 A1 Mar. 6, 2025

Related U.S. Application Data

(60) Provisional application No. 63/535,955, filed on Aug. 31, 2023.

(51) Int. Cl.
*H04W 16/18* (2009.01)
*H04L 41/12* (2022.01)

(52) U.S. Cl.
CPC ............. *H04W 16/18* (2013.01); *H04L 41/12* (2013.01)

(58) Field of Classification Search
CPC ............................... H04W 16/18; H04L 41/12
See application file for complete search history.

(56) References Cited

U.S. PATENT DOCUMENTS

2018/0316568 A1 11/2018 Gill et al.
2018/0324062 A1 11/2018 Chen et al.

| | | | |
|---|---|---|---|
| 2020/0271774 A1 | 8/2020 | Morello et al. | |
| 2021/0084712 A1* | 3/2021 | Chen | H04W 12/50 |
| 2021/0127306 A1* | 4/2021 | Cui | H04W 28/06 |
| 2022/0052924 A1* | 2/2022 | Bill | H04L 41/12 |
| 2022/0067158 A1* | 3/2022 | Sloane | H04L 63/1433 |
| 2023/0231773 A1* | 7/2023 | Wu | H04L 41/22 |
| | | | 709/220 |
| 2025/0047701 A1* | 2/2025 | Siddam | H04L 41/22 |

FOREIGN PATENT DOCUMENTS

EP 3616064 B1 3/2023

OTHER PUBLICATIONS

International Search Report and Written Opinion received for PCT Patent Application No. PCT/US24/38155, mailed on Oct. 31, 2024, 14 pages.

* cited by examiner

*Primary Examiner* — Abdullahi Ahmed
(74) *Attorney, Agent, or Firm* — Kipman T. Werking; Frontier IP Law PLLC

(57) ABSTRACT

Various example embodiments are directed a system that electronically discovers a plurality of current network components of an existing wireless network and relationships between the plurality network components. This is performed based on starting at a first network component and electronically continuously crawling through the wireless network via discovering and following links between the plurality of network components in real time. The system generates and then updates metadata describing a snapshot of a current network topology of the wireless network based on the continuous electronic discovery of the plurality of current network components of the existing wireless network and relationships between the plurality network components.

14 Claims, 7 Drawing Sheets

300

Electronically discover a plurality of current network components of an existing wireless network and relationships between the plurality network components

302

Generate metadata describing a snapshot of a current network topology of the wireless network
304

400

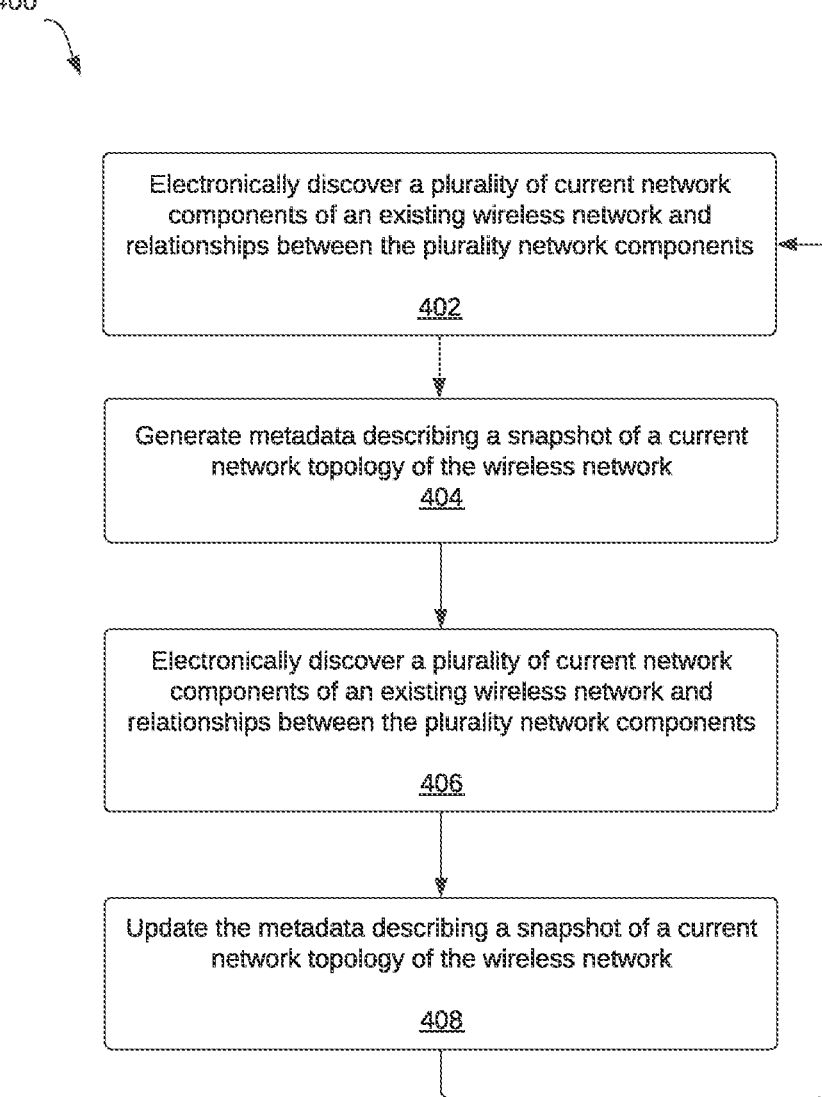

Electronically discover a plurality of current network components of an existing wireless network and relationships between the plurality network components

402

Generate metadata describing a snapshot of a current network topology of the wireless network
404

Electronically discover a plurality of current network components of an existing wireless network and relationships between the plurality network components

406

Update the metadata describing a snapshot of a current network topology of the wireless network

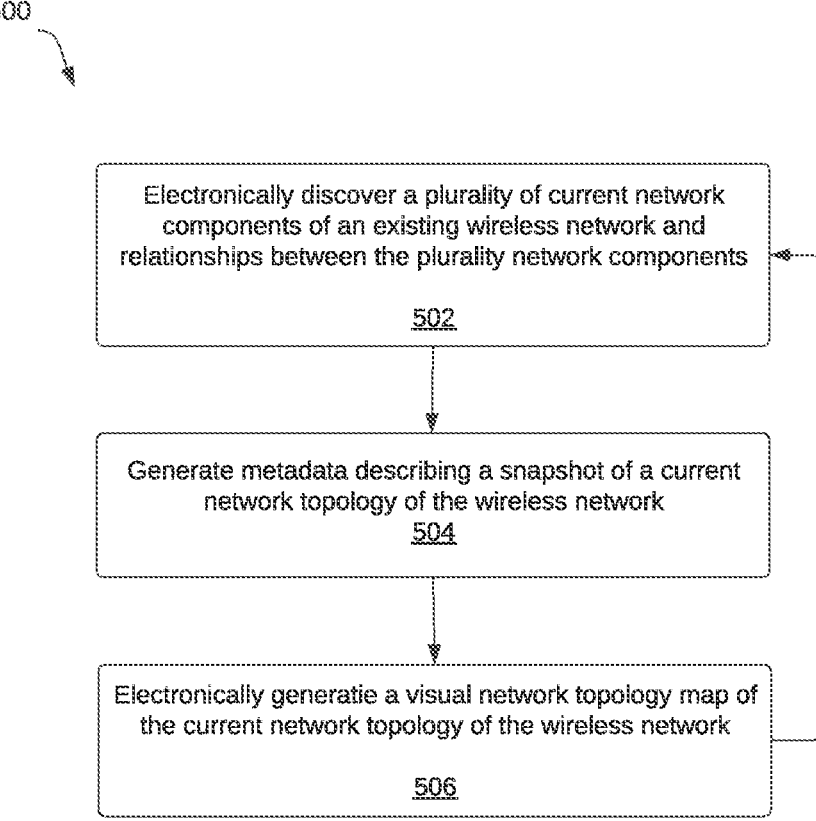

Electronically discover a plurality of current network components of an existing wireless network and relationships between the plurality network components

502

Generate metadata describing a snapshot of a current network topology of the wireless network
504

Electronically generatie a visual network topology map of the current network topology of the wireless network

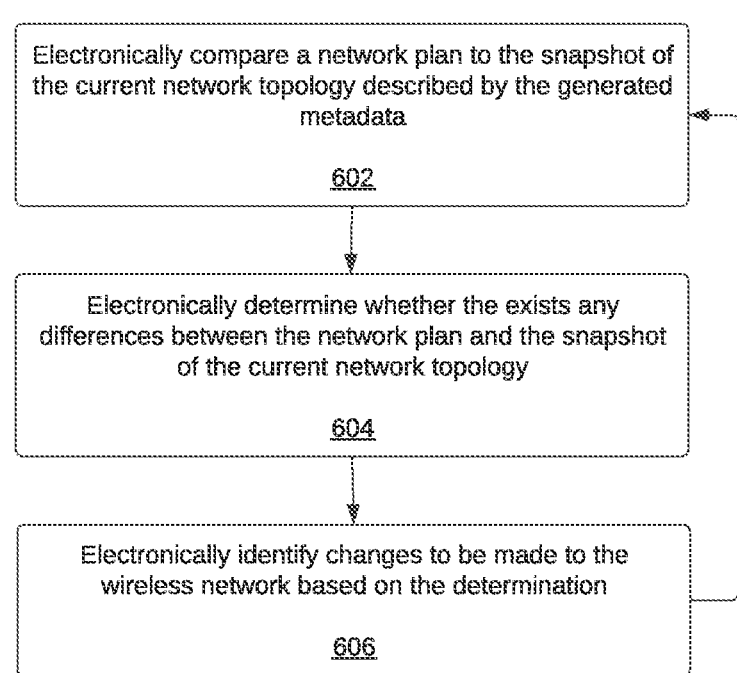
Electronically compare a network plan to the snapshot of the current network topology described by the generated metadata
602
Electronically determine whether the exists any differences between the network plan and the snapshot of the current network topology
604
Electronically identify changes to be made to the wireless network based on the determination
606
*Fig. 6*

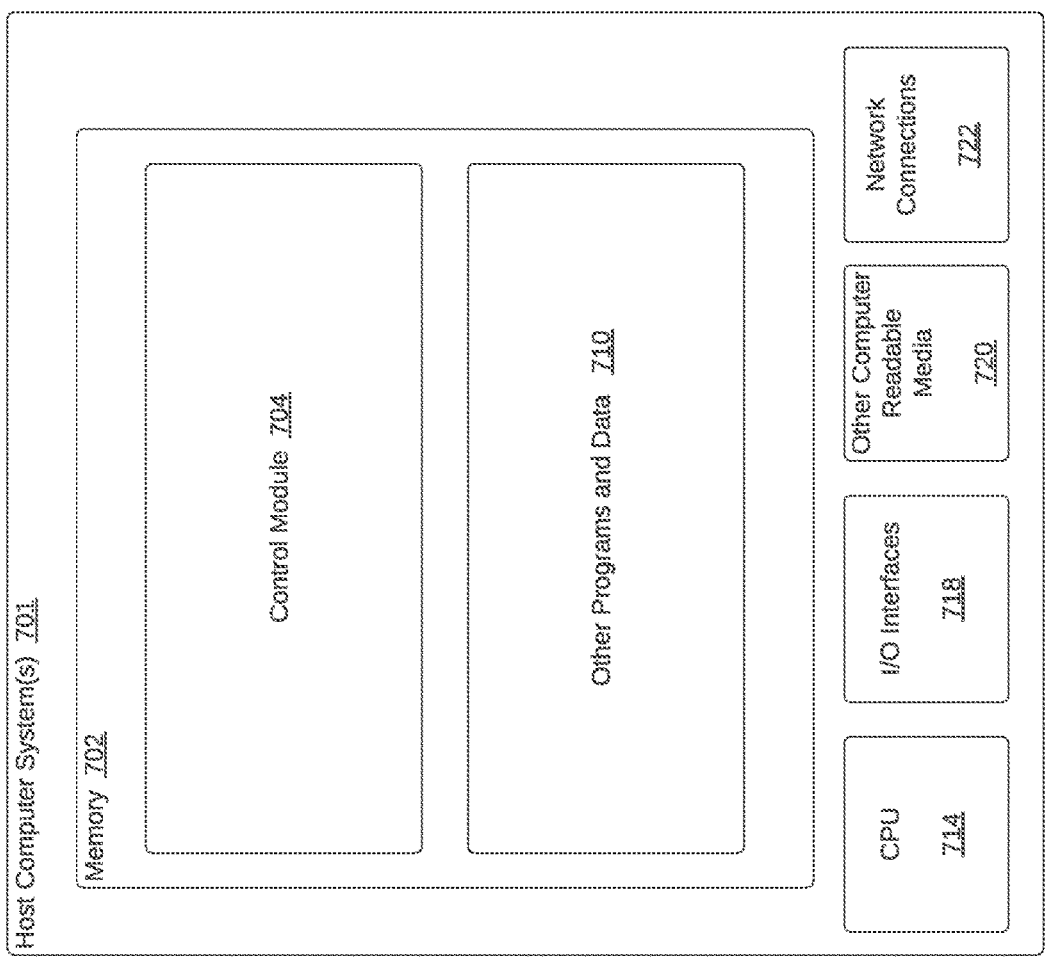
*Fig. 7*

SYSTEMS AND METHODS FOR GENERATING A SNAPSHOT OF CURRENT NETWORK TOPOLOGY

BRIEF SUMMARY

With the increasing complexity of networks and continuously changing network topologies, including, for example, fifth-generation (5G) wireless cellular networks, it can be difficult to efficiently determine in real time a current network topology and other network characteristics. In Network Operation Centers (NOCs), such information may be useful for determining whether the network currently complies with a network plan and to track the source of alarms and identify the root cause or causes of network failures.

To solve the above technical problems, disclosed herein are systems and methods for generating a snapshot of current network topology. In an example embodiment, the system electronically discovers a plurality of current network components of an existing wireless network and relationships between the plurality network components. This is based on starting at a first network component and electronically crawling through the wireless network via discovering and following links between the plurality of network components in real time. The system then generates metadata describing a snapshot of a current network topology of the wireless network based on the discovery of the plurality of current network components of the existing wireless network and relationships between the plurality network components. The above process may be performed continuously, or on demand, to generate updated network snapshots in real time. Such network snapshots may be used to create a digital twin of the network.

In an example embodiment, the above process may include learning the plurality of network components (e.g., network nodes) and links between the plurality of network components (e.g., network links) by electronically inspecting network interfaces, network infrastructure and/or network microservices including security associations associated with the plurality of current network components. For example, this may include inspecting network traffic such as network packets being transmitted and received in real time associated with the network interfaces, network infrastructure and/or network microservices.

The system may also electronically identify actions to be performed based on a determination whether there exists any differences between a network plan or configuration and the snapshot of the current network topology. For example, the actions may include corrective actions including drift detection to modify the network to adhere to the network plan. The system may then electronically initiate the actions to be performed based on the determination whether there exists any differences between the network plan and the snapshot of the current network topology. In some embodiments, the difference between snapshots of the current network may also be used to facilitate determining a root cause of a network failure or degradation of service, for example, by correlating the time and characteristics of the network failure to changes in the network at specific points in time as indicated by the snapshots generated in real time based on the continuous or periodic network crawling described above. The discovery and reachability of such network components may also aid in optimizing network design.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4 illustrates a logical flow diagram showing one embodiment of a process for continuously updating the metadata describing a snapshot of a current network topology of the wireless network useful in the process of FIG. 3 in accordance with embodiments described herein.

FIG. 5 illustrates a logical flow diagram showing one embodiment of a process for generating a visual network topology map of the current network topology of the wireless network useful in the process of FIG. 3 in accordance with embodiments described herein.

FIG. 6 illustrates a logical flow diagram showing one embodiment of a process for electronically identifying changes to be made to the wireless network useful in the process of FIG. 3 in accordance with embodiments described herein.

FIG. 7 shows a system diagram that describes an example implementation of an underlying computing system for implementing embodiments described herein.

DETAILED DESCRIPTION

Figures 1A, 1B, 1C, 1D:
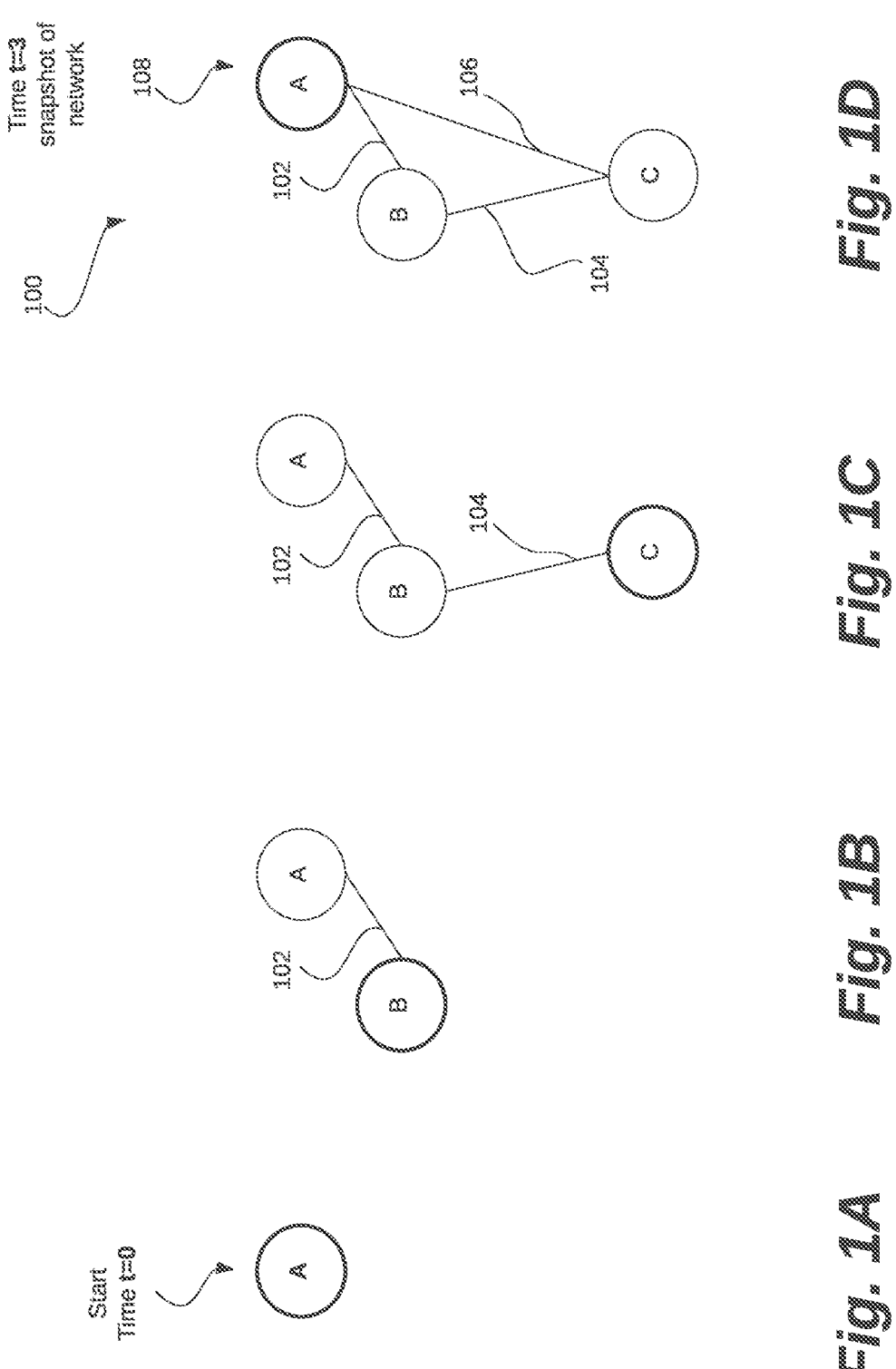
FIGS. 1A, 1B, 1C and 1D illustrate a snapshot of an existing wireless network being generated by electronically discovering a plurality of current network components of the existing wireless network and relationships between the plurality network components in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

FIGS. 1A through 1D illustrate a first snapshot 108 of an existing wireless network 100 being generated by electronically discovering a plurality of current network components of the existing wireless network 100 and relationships between the plurality network components in accordance with embodiments described herein.

In an example embodiment, the network 100 may be a network being monitored by a network operations center (NOC). network 100 shows various example network nodes: A, B, and C. The network nodes may represent various physical or logical network components, sub-components or functions.

For example, in a 5G wireless cellular network, the nodes may represent, but are not limited to, one or more or a combination of: 5G network functions (NF); the Core Network (CN), or components thereof (responsible for controlling the communication between the end user and the radio access network); the Radio Access Network (RAN) or components thereof (comprised of base stations and antennas that provide wireless connectivity to end-users); 5G Non-Standalone (NSA) and Standalone (SA) architectures or components thereof (defines the configuration and interworking between the 5G radio access network and an existing LTE network); physical components of a 5G network or components thereof; base stations (gNodeB or eNodeB) or components thereof (responsible for radio transmission and reception, and connecting the devices to the core network); antennas (responsible for radio transmission and reception and coverage); small cells (small and low-powered base stations that are deployed in densely populated areas to enhance coverage and capacity); 5G New Radio (NR) devices (the devices that support 5G, such as smartphones and IoT devices); user equipment (UE); network functions virtualization (NFV) infrastructure or components thereof (the virtualized infrastructure that supports the deployment of 5G network functions); cloud RAN (C-RAN) infrastructure or components thereof (a centralized radio access network architecture that enables the processing of radio signals in the cloud); data centers; network routers; virtual routers; individual servers, individual computers; individual processors; software objects; databases; application programming interfaces (APIs); policy and charging rules and data; operational support system (OSS) data or components; Business support systems (BSS) data or components; software containers; nodes; PODs; clusters; node groups; control planes; software defined data centers (SDDCs); microservices; virtualized environments; software platforms; cloud computing service software or components; network management software or components; network orchestrator software; artificial intelligence (AI) or machine learning (ML) programs, models or modules; user interfaces; operating systems; other network management functions; other NFs; sub-components of any of the aforementioned components; etc.

The lines between the nodes represent physical or logical links between the nodes (e.g., communication paths, relationships or other links). The particular arrangement and number of nodes shown in network 100 is provided as an example and the number, arrangement and types of nodes and the links between them may vary in different embodiments.

In the present example, the first snapshot 108 is generated by an electronic process implemented by a computerized system starting at an initial starting node on the network 100 (node A in the present example). For example, this may be performed using a known identifier of node A. The system electronically discovers a plurality of current network components of the existing wireless network 100 and relationships between the plurality network components based on starting at node A at time t=0 as shown in FIG. 1A and electronically crawling through the wireless network 100 via discovering and following links between the plurality of network components in real time.

For example, as shown in FIG. 1B, the system discovers node A has a link 102 from node A. The system follows link 102 and discovers it links to node B. As shown in FIG. 1C, the system discovers node B has a link 104 from node B. The system follows link 104 and discovers it links to node C. As shown in FIG. 1D, the system discovers node C has a link 106 from node C that was not previously identified by Node A, could be due to misconfiguration. But now due to 106, the operator can establish a bidirectional link by correcting it. The network is learning through discovery. The system follows link 106 and discovers it links to node A. In various embodiments, one node may have links to several different other nodes. The system traverses all the nodes and links in this manner until there are no nodes or links left in the network 100. In the present example, at time t=3 the system discovered the network 100 currently has three nodes (node A, node B and node C) and three associated links (link 102, link 104 and link 106). However, in various embodiments, there may be many more (e.g., hundreds, thousands or more) nodes and links.

In the present example shown in FIG. 1D, the system generates metadata describing the first snapshot 108 of the current network topology of the wireless network 100 at time t=3 based on the discovery the plurality of current network components (node A, node B and node C) of the existing wireless network 100 and relationships between the plurality network components (link 102, link 104 and link 106). In an example embodiment, such metadata may include identifiers or descriptors of node A, node B and node C and link 102, link 104 and link 106. For example, such identifiers or descriptors may be used by a network topology mapping or illustration program, service or device that uses such information to generate the first snapshot 108 of the current network topology of the wireless network 100.

The crawling through the wireless network 100 via discovering and following links between the plurality of network components in real time may include learning the plurality of network components (e.g., node A, node B and node C) and links between the plurality of network components (e.g., link 102, link 104 and link 106) by electronically inspecting one or more of: network interfaces, network infrastructure and network microservices associated with the plurality of current network components. This may also help in containment during a security breach incident.

FIGS. 2A through 2D illustrate a second snapshot 206 of the existing wireless network 100 being generated starting at a subsequent point in time (t=3) showing how the network 100 has changed by again electronically discovering a plurality of current network components of the existing wireless network and relationships between the plurality network components starting at the subsequent point in time in accordance with embodiments described herein.

The network 100 may change over time (e.g., via the network 100 adding or removing network components and/ or relationships between such network components). Thus, the system may periodically or continuously perform the electronic discovery of the plurality of current network components and relationships between the plurality network components and, based thereon, periodically or continuously update the metadata describing a snapshot of the current network topology of the wireless network 100.

Figures 2A, 2B, 2C, 2D:
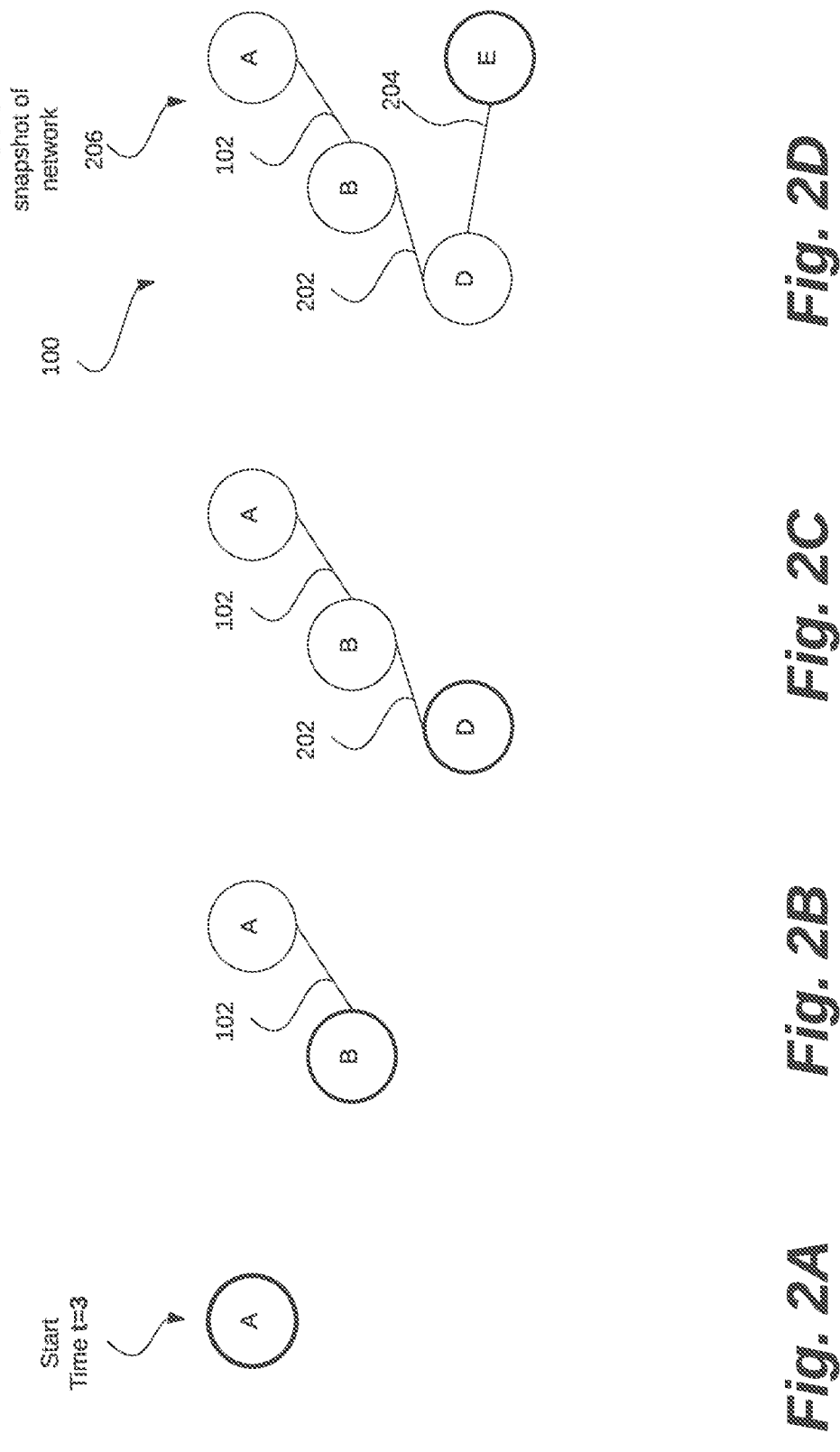
FIGS. 2A 2B, 2C and 2D illustrate a second snapshot of the existing wireless network being generated starting at a subsequent point in time showing how the network has changed by again electronically discovering a plurality of current network components of the existing wireless network and relationships between the plurality network components starting at the subsequent point in time in accordance with embodiments described herein.

In the present example, the second snapshot 206 is generated by an electronic process implemented by a computerized system starting at an initial starting node on the network 100 (node A in the present example shown in FIG. 2A). Other nodes of the network 100 for which a respective identifier is known may be used as a starting node in various other embodiments. For example, this may be performed using a known identifier of node A. The system electronically discovers a plurality of current network components of the existing wireless network 100 and relationships between the plurality network components based on starting node A at time t=3 as shown in FIG. 2A and electronically crawling through the wireless network 100 via discovering and following links between the plurality of network components in real time.

For example, as shown in FIG. 2B, the system discovers node A has a link 102 from node A. The system follows link 102 and discovers it links to node B. As shown in FIG. 2C, the system discovers node B has a link 202 from node B. The system follows link 202 and discovers it links to node D. As shown in FIG. 2D, the system discovers node D has a link 2-4 from node D. The system follows link 204 and discovers it links to node E. The system traverses all the nodes and links in this manner until there are no nodes or links left in the network 100. In the present example, at time t=6 the system has discovered the network 100 currently has four nodes and three associated links. Note this discovery via crawling through the network 100 reveals the network topology has changed from what it was at time t=3 shown in FIG. 1D.

In the present example shown, the system generates metadata describing the second snapshot 206 at time t=6 of the current network topology of the wireless network 100 based on the discovery the plurality of current network components (node A, node B, node D and node E) of the existing wireless network 100 and relationships between the plurality network components (link 102, link 202 and link 204). In an example embodiment, such metadata may include identifiers or descriptors of node A, node B, node D and node E and link 102, link 202 and link 204. For example, such identifiers or descriptors may be used by a network topology mapping or illustration program, service or device that uses such information to generate the second snapshot 206 of the current network topology of the wireless network 100.

Figure 3:
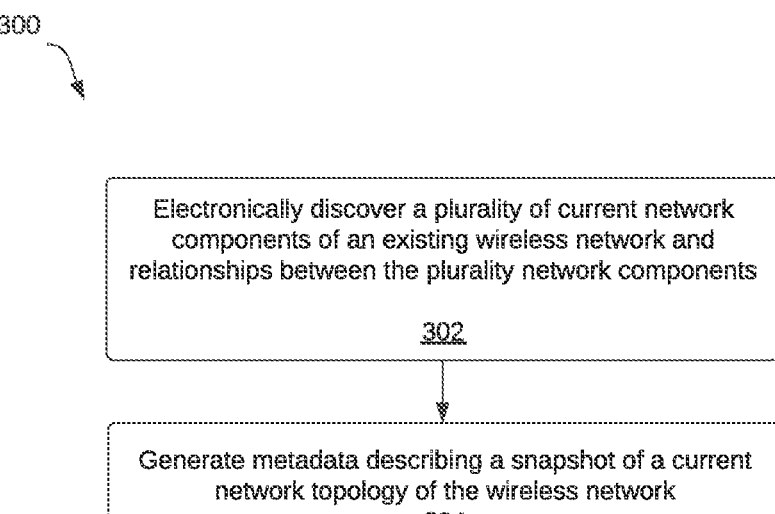
FIG. 3 illustrates a logical flow diagram showing one embodiment of a process for generating metadata describing a snapshot of a current network topology in accordance with embodiments described herein.

FIG. 3 illustrates a logical flow diagram showing one embodiment of a process 300 for generating metadata describing a snapshot of a current network topology in accordance with embodiments described herein.

At 302, the system electronically discovers a plurality of current network components of an existing wireless network and relationships between the plurality network components based on starting at a first network component and electronically crawling through the wireless network via discovering and following links between the plurality of network components in real time.

At 304, the system generates metadata describing a snapshot of a current network topology of the wireless network based on the electronically discovering the plurality of current network components of the existing wireless network and relationships between the plurality network components. The system may electronically generate a visual network topology map of the current network topology of the wireless network based on the generated metadata describing the snapshot of the current network topology of the wireless network.

In an example embodiment, the crawling through the wireless network via discovering and following links between the plurality of network components in real time includes learning the plurality of network components and links between the plurality of network components by electronically inspecting one or more of: network interfaces, network infrastructure and network microservices associated with the plurality of current network components.

The electronically inspecting one or more of: network interfaces, network infrastructure and network microservices associated with the plurality of current network components may include inspecting network traffic including inspecting network packets being transmitted and received in real time associated with one or more of: network interfaces, network infrastructure and network microservices. In such instances, the generating metadata describing a snapshot of a current network topology of the wireless network may include generating metadata, based on the inspection of network packets, that describes the plurality of current network components of the existing wireless network and the relationships between the plurality of components.

FIG. 4 illustrates a logical flow diagram showing one embodiment of a process 400 for continuously updating the metadata describing a snapshot of a current network topology of the wireless network useful in the process 300 of FIG. 3 in accordance with embodiments described herein.

At 402, the system electronically discovers a plurality of current network components of an existing wireless network and relationships between the plurality network components based on starting at a first network component and electronically crawling through the wireless network via discovering and following links between the plurality of network components in real time.

At 404, the system generates metadata describing a snapshot of a current network topology of the wireless network based on the electronically discovering the plurality of current network components of the existing wireless network and relationships between the plurality network components.

At 406, the system continues to electronically discover a plurality of current network components of the existing wireless network and relationships between the plurality network components based on starting at a first network component and electronically crawling through the wireless network via discovering and following links between the plurality of network components in real time. In an example embodiment, the continuing to electronically discover a plurality of current network components of the existing wireless network and relationships between the plurality network components may be performed once the network has been initially entirely traversed as described above or performed in parallel, concurrently or partially concurrently with the initial process after the initial process of network crawling described above has started. This continuing network crawling process may be performed starting at the same initial starting first network component or a different starting network component of the network. Thus, the system may continuously perform the electronically discovering a plurality of current network components and relationships between the plurality network components.

At 408, the system continuously updates the metadata describing a snapshot of a current network topology of the wireless network based on continuously performing the discovering of a plurality of current network components and relationships between the plurality of network components. For example, this may result in many snapshots of the network being generated and saved separately as separate files chronologically at different points in time or a single snapshot being updated chronologically at different points in time as the updating occurs. The system may then return to 402 (e.g., immediately or after waiting a predetermined amount of time) to continue the process described above.

FIG. 5 illustrates a logical flow diagram showing one embodiment of a process 500 for generating a visual network topology map of the current network topology of the wireless network useful in the process 300 of FIG. 3 in accordance with embodiments described herein.

At 502, the system electronically discovers a plurality of current network components of an existing wireless network and relationships between the plurality network components based on starting at a first network component and electronically crawling through the wireless network via discovering and following links between the plurality of network components in real time.

At 504, the system generates metadata describing a snapshot of a current network topology of the wireless network based on the electronically discovering the plurality of current network components of the existing wireless network and relationships between the plurality network components.

At 506, the system electronically generates a visual network topology map of the current network topology of the wireless network based on the generated metadata describing the snapshot of the current network topology of the wireless network. The system may return to 502 (e.g., immediately or after waiting a predetermined amount of time) to continue the process described above.

FIG. 6 illustrates a logical flow diagram showing one embodiment of a process 600 for electronically identifying changes to be made to the wireless network useful in the process 300 of FIG. 3 in accordance with embodiments described herein.

At 602, the system electronically compares a network plan to the snapshot of the current network topology described by the generated metadata.

At 604, the system electronically determines whether the exists any differences between the network plan and the snapshot of the current network topology based on the comparison.

At 606, the system electronically identifies changes to be made to the wireless network based on the determination whether the exists any differences between the network plan to the snapshot of the current network topology. The system may return to 602 (e.g., immediately or after waiting a predetermined amount of time) to continue the process described above for additional snapshots taken at different times.

In an example embodiment, the system may also electronically identify actions to be performed based on the determination whether the exists any differences between the network plan and the snapshot of the current network topology. For example, the actions may include corrective actions to modify the network to adhere to the network plan. The system may then electronically initiate the actions to be performed based on the determination whether the exists any differences between the network plan and the snapshot of the current network topology. In some embodiments, the difference between snapshots of the current network may also be used to facilitate determining a root cause of a network failure by correlating the time and characteristics of the network failure to changes in the network at specific points in time as indicated by the snapshots generated based on the continuous or periodic network crawling.

FIG. 7 shows a system diagram that describes an example implementation of an underlying computing system 700 for implementing embodiments described herein.

The functionality described herein for systems and methods for generating a snapshot of current network topology can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 7 illustrates an example of underlying hardware on which such software and functionality described herein may be hosted and/or implemented.

In particular, shown is example host computer system(s) 701. For example, such computer system(s) 701 may represent one or more of those in various NOCs, data centers, base stations and cell sites that are, or that host or implement the functions of: routers, components, microservices, PODs, containers, nodes, node groups, control planes, clusters, virtual machines, NFs, and other aspects or components for generating a snapshot of current network topology. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for systems and methods for generating a snapshot of current network topology. Memory 702 may also store other programs and data 710, which may include rules, databases, application programming interfaces (APIs), OSS data, BSS data, software containers, nodes, PODs, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include location data interfaces, sensor data interfaces, interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
at least one memory that stores computer instructions; and
at least one processor that executes the computer instructions to perform actions, the actions including:
electronically discovering a plurality of current network components of an existing wireless network and relationships between the plurality of current network components based on starting at a first network component and electronically crawling through the wireless network via discovering and following links between the plurality of current network components in real time; and
generating metadata describing a snapshot of a current network topology of the wireless network based on the electronically discovering the plurality of current network components of the existing wireless network and relationships between the plurality of current network components;
wherein:
the crawling through the wireless network via discovering and following links between the plurality of current network components in real time includes learning the plurality of current network components and links between the plurality of current network components by electronically inspecting one or more of: network interfaces, network infrastructure and network microservices associated with the plurality of current network components.

2. The system of claim 1, wherein the electronically inspecting one or more of: network interfaces, network infrastructure and network microservices associated with the plurality of current network components includes inspecting network traffic including inspecting network packets being transmitted and received in real time associated with the one or more of: network interfaces, network infrastructure and network microservices.

3. The system of claim 2 wherein the generating metadata describing the snapshot of the current network topology of the wireless network includes generating metadata, based on the inspection of network packets, that describes the plurality of current network components of the existing wireless network and the relationships between the plurality of current network components.

4. The system of claim 1, wherein the actions further comprise:
electronically generating a visual network topology map of the current network topology of the wireless network based on the generated metadata describing the snapshot of the current network topology of the wireless network.

5. The system of claim 1, wherein the actions further comprise:
electronically comparing a network plan to the snapshot of the current network topology described by the generated metadata; and
electronically determining whether there exists any differences between the network plan and the snapshot of the current network topology based on the comparison.

6. The system of claim 5, wherein the actions further comprise:
electronically identifying changes to be made to the wireless network based on the determination whether there exists any differences between the network plant and the snapshot of the current network topology.

7. The system of claim 5, wherein the actions further comprise:
electronically identifying actions to be performed based on the determination whether there exists any differences between the network plan and the snapshot of the current network topology.

8. The system of claim 7, wherein the actions further comprise:
electronically initiating the actions to be performed based on the determination whether there exists any differences between the network plan and the snapshot of the current network topology.

9. A method comprising:
electronically discovering a plurality of current network components of an existing wireless network and relationships between the plurality of current network components based on starting at a first network component and electronically crawling through the wireless network via discovering and following links between the plurality of current network components in real time; and
generating metadata describing a snapshot of a current network topology of the wireless network based on the electronically discovering the plurality of current network components of the existing wireless network and relationships between the plurality of current network components;
wherein:
the crawling through the wireless network via discovering and following links between the plurality of current network components in real time includes learning the plurality of current network components and links between the plurality of current network components by electronically inspecting one or more of: network interfaces, network infrastructure and network micro-services associated with the plurality of current network components.

10. The method of claim 9 wherein the electronically inspecting one or more of: network interfaces, network infrastructure and network microservices associated with the plurality of current network components includes inspecting network traffic including inspecting network packets being transmitted and received in real time associated with the one or more of: network interfaces, network infrastructure and network microservices.

11. The method of claim 10 wherein the generating metadata describing the snapshot of the current network topology of the wireless network includes generating metadata, based on the inspection of network packets, that describes the plurality of current network components of the existing wireless network and the relationships between the plurality of current network components.

12. A non-transitory computer-readable storage medium having computer-executable instructions stored thereon that, when executed by at least one computer processor, cause actions to be performed including:

electronically discovering a plurality of current network components of an existing wireless network and relationships between the plurality of current network components based on starting at a first network component and electronically crawling through the wireless network via discovering and following links between the plurality of current network components in real time; and generating metadata describing a snapshot of a current network topology of the wireless network based on the electronically discovering the plurality of current network components of the existing wireless network and relationships between the plurality of current network components;

wherein:

the crawling through the wireless network via discovering and following links between the plurality of current network components in real time includes learning the plurality of current network components and links between the plurality of current network components by electronically inspecting one or more of: network interfaces, network infrastructure and network microservices associated with the plurality of current network components.

13. The non-transitory computer-readable storage medium of claim 12, wherein the electronically inspecting one or more of: network interfaces, network infrastructure and network microservices associated with the plurality of current network components includes inspecting network traffic including inspecting network packets being transmitted and received in real time associated with the one or more of: network interfaces, network infrastructure and network microservices.

14. The non-transitory computer-readable storage medium of claim 13 wherein the generating metadata describing the snapshot of the current network topology of the wireless network includes generating metadata, based on the inspection of network packets, that describes the plurality of current network components of the existing wireless network and the relationships between the plurality of current network components.

\* \* \* \* \*